July 14, 1925.
F. J. RIPPL
1,546,352
GLASS SEVERING APPARATUS
Filed July 8, 1921
3 Sheets-Sheet 3
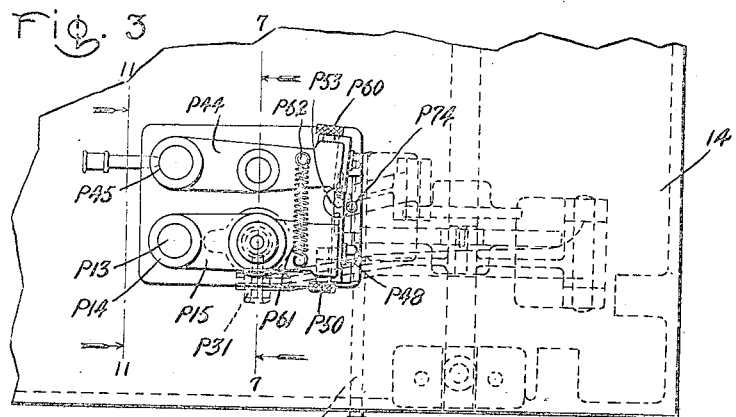
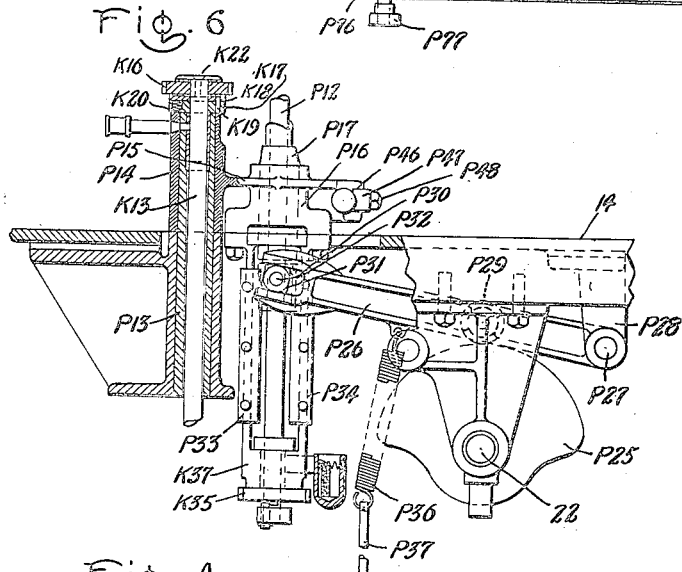
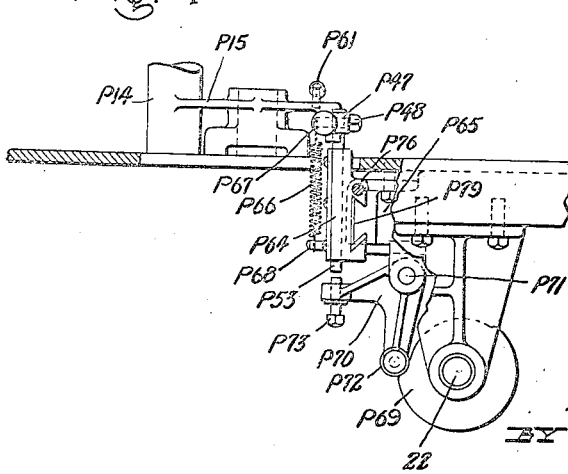
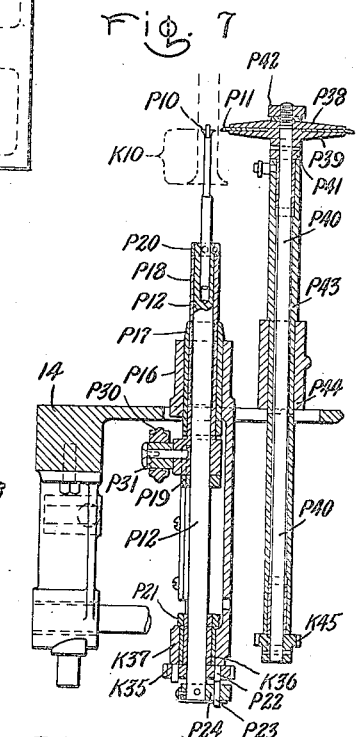
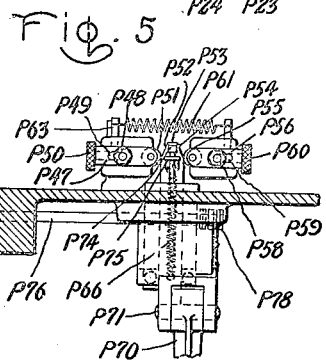
INVENTOR:
FRANCIS J. RIPPL,
BY
Albert G. Davis
HIS ATTORNEY.

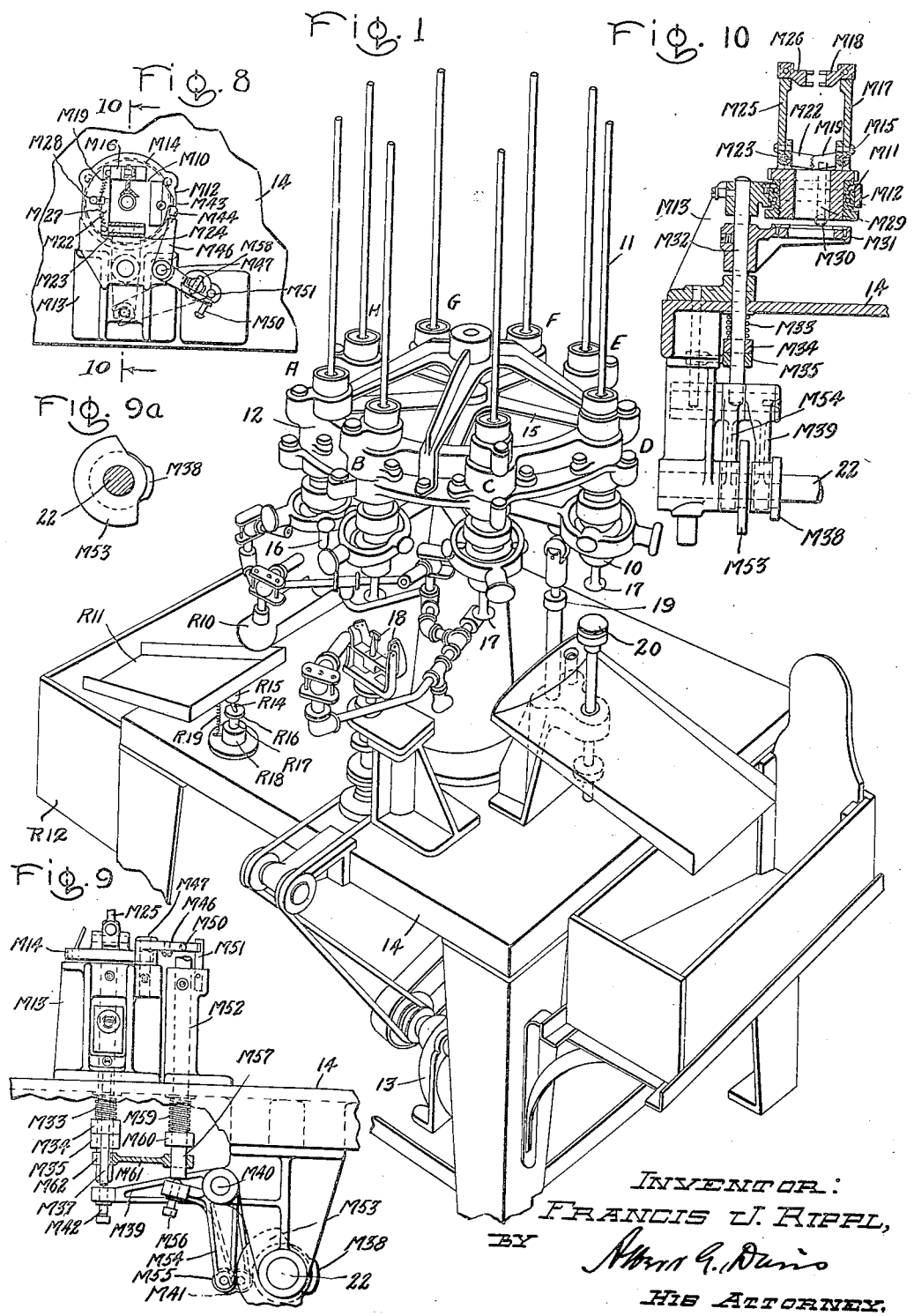

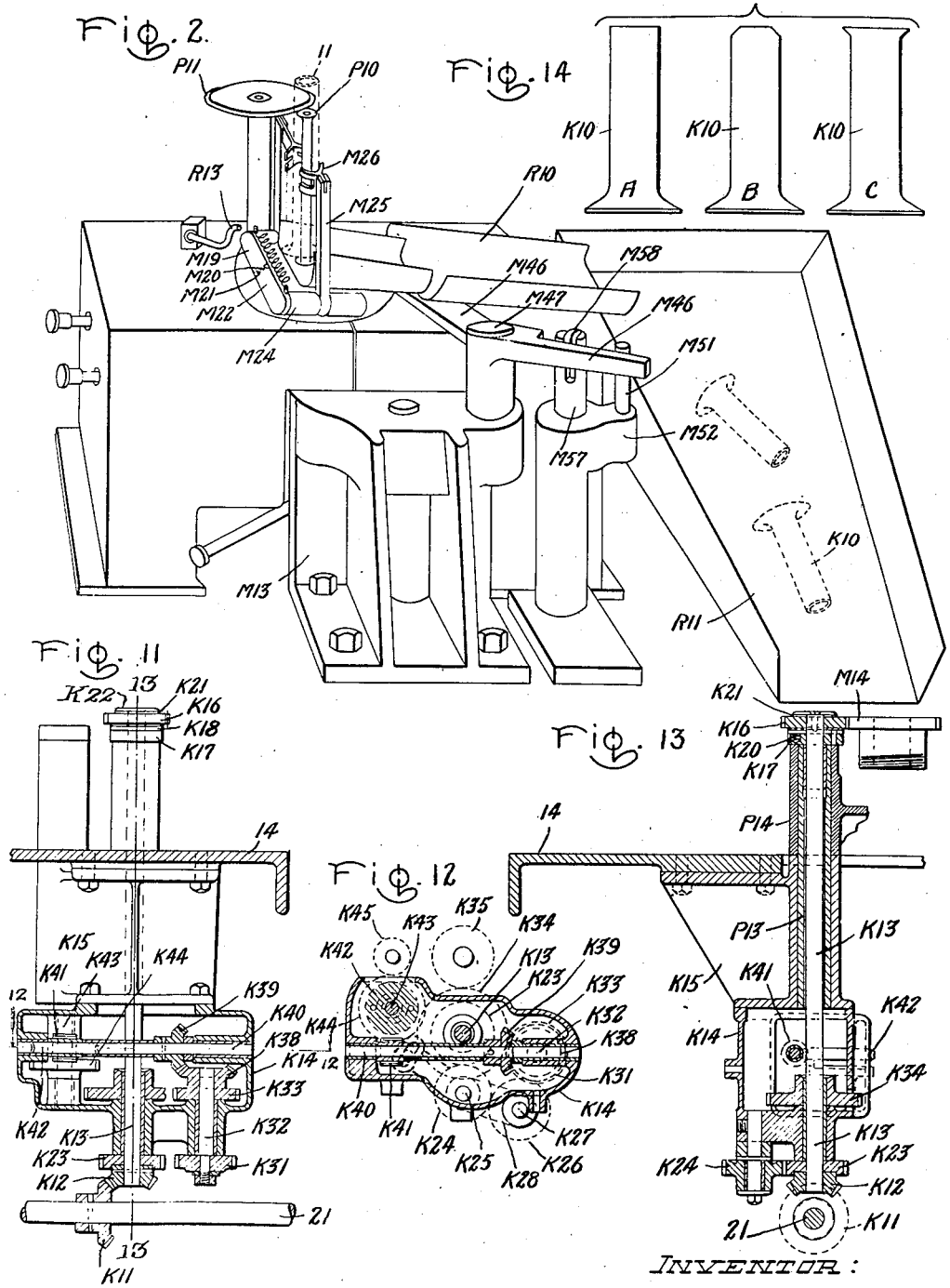

Patented July 14, 1925.

1,546,352

UNITED STATES PATENT OFFICE.

FRANCIS J. RIPPL, OF CLEVELAND, OHIO, ASSIGNOR TO GENERAL ELECTRIC COMPANY, A CORPORATION OF NEW YORK.

GLASS-SEVERING APPARATUS.

Application filed July 8, 1921. Serial No. 483,332.

*To all whom it may concern:*

Be it known that I, FRANCIS J. RIPPL, a citizen of the United States, residing at Cleveland, in the county of Cuyahoga, State of Ohio, have invented certain new and useful Improvements in Glass-Severing Apparatus, of which the following is a specification.

My invention relates to glass severing and more particularly, to a method and apparatus for severing glass cylinders or tubing.

The severing of glass tubing by means employed heretofore has often resulted in leaving the end of the piece of tubing which is cut off and the end of the tubing in such condition that it has usually been found desirable to refinish before reworking the tubing or the piece cut from it.

Through my invention the glass tubing is severed cleanly and the edges of the glass tubing and of the severed glass tubing are left in a finished condition and both the tubing and the severed piece may be reworked without receiving further attention on the severed ends. I accomplish this result by subjecting the wall of the glass tubing to the action of a cutting edge on both the inside and the outside of the tubing. The tubing is thus cut evenly and smoothly. Although not limited thereto in use, my method is especially adapted for severing finished glass tubular articles from glass tubing such, for example, as flares made from tubing as described in the application of Rippl and Malloy, Serial No. 483,334, filed July 8, 1921, in the application just referred to is described a machine for producing flares for incandescent lamp manufacture from glass tubing.

In the accompanying drawing, Fig. 1 is a perspective view of a machine which employs the severing means of my invention;

Fig. 2 is a perspective view showing a specific embodiment of my invention as applied to the machine of Fig. 1;

Fig. 3 is a fragmentary top plan view of the machine of Fig. 1 showing the apparatus of Fig. 2 as mounted on the machine of Fig. 1;

Fig. 4 is a side elevation of Fig. 3 broken for the sake of clearness to show the cutter separating mechanism;

Fig. 5 is an end elevation of Fig. 4 broken away to show more clearly the cutter separating mechanism;

Fig. 6 is a side elevation of Fig. 3 broken for the sake of clearness to show the small cutter raising and lowering mechanism;

Fig. 7 is a sectional front elevation of the cutters on the line 7—7 of Fig. 3;

Fig. 8 is a fragmentary top plan view of the lower chuck;

Fig. 9 is a side elevation of the view of Fig. 8 showing the lower chuck opening mechanism and stopping mechanism;

Fig. 9ª is a detail of the view of Fig. 9;

Fig. 10 is a sectional elevation of the lower chuck on the line 10—10 of Fig. 8;

Fig. 11 is an elevation, partially in section, on the line 11—11 of Fig. 3 showing the driving mechanism for the cutters;

Fig. 12 is a top plan view of the mechanism of Fig. 11 on the line 12—12;

Fig. 13 is a sectional elevation of the mechanism of Fig. 11 on the line 13—13;

Fig. 14 is a diagram showing variations which may be made in cutting off a flare.

In general the machine for producing flares from glass tubing which is fully disclosed in the application of Rippl and Malloy previously mentioned comprises a number of chucks 10 for holding the glass tubing 11 which are mounted on a rotatable carrier 12. The carrier 12 is caused to advance step by step by means of suitable intermittent driving mechanism which receives its power from the motor 13 mounted in the base 14 of the machine. The chucks 10 are continuously rotated by the driving gear 15 which engages suitable gears fastened to the chucks and which is driven through intermediate mechanism by the motor 13. At position A, represented in Fig. 1 by the position of the chuck lettered A, the straight end 16 of the tubing 11 is heated by gas jets. At position B, designated similarly to position A, the tubing 11 is further heated while a flange 17 is formed on the end thereof by the flanging mechanism 18. Position C is a cooling position. At position D, the chuck opening mechanism 19 causes the chuck 10 to release the tubing 11 for an interval while the gauging mechanism 20 regulates the amount of tubing fed through the chuck. At positions E, F and G, the glass tubing 11 is heated at the zone of severing by suitable gas burners. Position H is the severing or cutting-off position. Here the tubing 11 is further heated at the severing zone while subjected to the action of a severing mechanism which is a specific embodiment of apparatus adapted to sever glass tubing according to the method of my invention.

*Cutting off mechanism.*—As previously described, the glass tubing 11 with the flange 17 on the lower end thereof is heated at the zone of severing in the positions E, F and G and also in the cutting-off position H (see Fig. 3). The severing mechanism K comprises mechanism M (Figs. 8, 9 and 10) for holding and synchronously rotating the flare $K^{10}$ (Fig. 1) which is being cut from the glass tubing 11 and mechanism P (Figs. 3, 4, 5, 6 and 7) for performing the actual cutting off or severing of the flare in the preheated zone. Briefly, the operation is carried out as follows: The gauged and lowered glass tube 11, which has previously been flanged and preheated in the zone of cut off or severing as briefly described previously, is advanced by the carrier 12 into the position H. Immediately the chuck mechanism M acts to hold the lower end of the tubing 11 and to rotate it synchronously with the upper end, the tubing 11 having an intermediate softened portion due to the heating in the zone of cut off or severing. The cutting mechanism P then operates to sever the tubing 11 leaving the flare $K^{10}$ (Fig. 1) in the chuck M. Thereupon chuck M releases the flare $K^{10}$ which is discharged into a chute R which delivers it to a suitable container. In order to simplify the description, each part of the mechanism will be described separately giving the drive the letter K of the cutting off mechanism, as a whole; the tubing holding means or chuck, the letter M; the means for cutting the tubing, the letter P, and the delivery chute, the letter R; in each case the proper letters are coupled with suitable numerals.

The cutting off mechanism drive is effected from the main driving shaft 21, which is mounted in the base 14, by a bevel gear $K^{11}$ (Fig. 11) attached thereto which meshes with and drives a bevel gear $K^{12}$ fastened to the vertical shaft $K^{13}$ which has suitable bearings in the housing $K^{14}$ and the bracket $K^{15}$ to which the housing $K^{14}$ is attached. The bracket $K^{15}$ is fastened to the base 14. A gear $K^{16}$ rotatably held on the upper end of the shaft $K^{13}$ is normally caused to rotate therewith by the friction clutch $K^{17}$ fastened to the shaft $K^{13}$ so as to drive the chuck M as described hereinafter (Fig. 6). The clutch $K^{17}$ has a leather-faced disk $K^{18}$ driven by a pin $K^{19}$ fastened in the clutch and held against the gear $K^{16}$ by a spring $K^{20}$ carried in a recess in the clutch $K^{17}$. A leather disc $K^{21}$, between the gear $K^{16}$ and the retaining screw $K^{22}$ fastened in the end of the shaft $K^{13}$, also tends to rotate the gear $K^{16}$ with the shaft $K^{13}$.

To the lower end of the shaft $K^{13}$ is also fastened a gear $K^{23}$ (Figs. 11 and 12) which effects the drive of each of the two cutters which form a part of the cutting mechanism P as more completely set forth hereinafter. The gear $K^{23}$ drives the idler gear $K^{24}$ (see also Fig. 13) which is rotatably mounted on the pin $K^{25}$ fastened in the housing $K^{14}$. The gear $K^{24}$ drives another idler gear $K^{26}$ which is rotatably carried on a pin $K^{27}$ mounted in an arm of the member $K^{28}$ which is pivoted on the pin $K^{25}$ and locked into position by a bolt $K^{29}$ which screws into the housing $K^{14}$ and which works in a slot $K^{30}$ on the other arm of the member $K^{28}$. The member $K^{28}$ is so positioned that the gear $K^{26}$ meshes with and drives a gear $K^{31}$ mounted on the short vertical shaft $K^{32}$ suitably mounted in the housing $K^{14}$. Near the upper end of the shaft $K^{32}$ is fastened a gear $K^{33}$ which drives the gear $K^{34}$ rotatably carried on the shaft $K^{13}$. The gear $K^{34}$ drives a gear $K^{35}$ (see also Figs. 6 and 7) with tubular hub extension $K^{36}$ which is rotatably mounted in the bracket $K^{37}$ more fully described hereinafter. The gear $K^{35}$ drives the smaller of the two cutters as will be described later.

Just above the gear $K^{33}$ on the shaft $K^{32}$ is fastened a bevel gear $K^{38}$ (Figs. 11 and 12) which drives the bevel gear $K^{39}$ fastened on the horizontal shaft $K^{40}$ suitably carried in the housing $K^{14}$. On the end of the shaft $K^{40}$ opposite to the gear $K^{39}$ is fastened a worm gear $K^{41}$ which drives a worm wheel $K^{42}$ fastened on the vertical shaft $K^{43}$ mounted in the housing $K^{14}$. Below the worm wheel $K^{42}$ and on the shaft $K^{43}$ is fastened a gear $K^{44}$ which drives the gear $K^{45}$ (see also Fig. 7) connected to the larger of the cutters as more fully described hereinafter.

The chuck mechanism includes a main member $M^{10}$ (Figs. 8, 9 and 10) which is carried on a ball race $M^{11}$ mounted in an arm $M^{12}$ of the bracket $M^{13}$ mounted on the base 14. Around the periphery of the upper part of the main member $M^{10}$ is cut a gear $M^{14}$ which meshes with and is driven by the gear $K^{16}$ (see Figs. 3, 6 and 11) previously described. Fastened to the pin $M^{15}$ (Fig. 10) which is carried in the lugs $M^{16}$ (Fig. 8) on the top of the member $M^{10}$, is a vertical arm $M^{17}$ which has at its upper end a V-shaped engaging finger $M^{18}$. To the end of the pin $M^{15}$ is fastened a horizontal arm $M^{19}$ whose end is rounded and has teeth $M^{20}$ which mesh with similar teeth $M^{21}$ on the end of the horizontal arm $M^{22}$ similar to arm $M^{19}$ and fastened to the end of the pin $M^{23}$ (see also Fig. 9) carried on the lugs $M^{24}$ on the main member $M^{10}$. A vertical arm $M^{25}$ similar to the arm $M^{17}$ is fastened to the pin $M^{23}$ and fastened to the upper end of the arm $M^{25}$ is a V-shaped engaging finger $M^{26}$ similar to the finger $M^{18}$. Through the teeth $M^{20}$ and $M^{21}$ the motion imparted to one engaging finger is correspondingly imparted to the other engaging finger. A spring $M^{27}$, fastened at the middle to a pin $M^{28}$ mounted on the member $M^{10}$ and at each end to the horizontal arms $M^{19}$ and $M^{22}$, tends to close the engaging fingers $M^{18}$ and $M^{26}$ toward each other. The engaging fingers $M^{18}$ and $M^{26}$ are caused to separate as follows. A rod $M^{29}$ (Fig. 10) is seated at its upper end in the horizontal arm $M^{19}$ being vertically aligned in a suitable hole in the main member $M^{10}$ and has a roller $M^{30}$ pinned in its lower end. The roller $M^{30}$ rides on the surface of a ring-shaped arm $M^{31}$ disposed concentric with the main member $M^{10}$ and fastened to a vertical rod $M^{32}$ which is slidably supported in the bracket $M^{13}$. A spring $M^{33}$ (Figs. 9 and 10) mounted around the rod $M^{32}$ between the stop $M^{34}$ fastened thereto and the base 14 tends to hold the rod $M^{32}$ in a lowered position which may be regulated by adjusting the position of the arm $M^{31}$ relative to the rod $M^{32}$. The angular alignment of the rod $M^{32}$ is maintained by an arm $M^{35}$ fastened to the lower end thereof and having in its other end a slot which receives the pin $M^{37}$ mounted in the base 14. The rod $M^{32}$ is raised to force the rod $M^{29}$ upward by means of the arm $M^{31}$, and thereby to cause the separation of the engaging fingers $M^{18}$ and $M^{26}$, by the action of a cam $M^{38}$ fastened to the cam shaft 22 which is suitably mounted in the base 14. The action of the cam $M^{38}$ is transmitted to the rod $M^{32}$ by the crank $M^{39}$ which is pivoted on the pin $M^{40}$ mounted in the base 14 and which has on one arm a roller $M^{41}$ riding on the cam $M^{38}$ and on the other arm an adjustable bolt $M^{42}$ which engages the rod $M^{32}$ to raise the same when so acted upon by the cam $M^{38}$. The amount of lift given to the rod $M^{32}$ by the bolt $M^{42}$ may be regulated by adjusting the bolt $M^{42}$ in the arm of the crank $M^{39}$. The contour of the cam $M^{38}$ (see also Fig. 9a) is such that once during every revolution the engaging fingers $M^{18}$ and $M^{26}$ are caused to be separated and then are permitted to be brought together again by the action of the spring $M^{27}$.

As previously stated, the rotation of the chuck M is stopped after the flare $K^{10}$ has been cut off to permit the discharge of the same and to permit the indexing of the succeeding glass tubing 11 into position. The chuck is opened after its rotation has been stopped for the discharge of the flare and is closed again after it has started to rotate. The chuck is preferably stopped in a predetermined position to permit the proper discharge of the flare $K^{10}$ and to provide clearance between the engaging fingers $M^{18}$ and $M^{26}$ and the succeeding glass tubing 11. The position of stopping is preferably with the common center line of the two engaging fingers $M^{18}$ and $M^{26}$ perpendicular to the path of rotation of the chuck is effected in the The stopping of the chuck is effected in the following manner. A projection $M^{43}$ (Fig. 8) is fastened to the upper surface of the main member $M^{10}$ so that it may be engaged by the head of a plunger $M^{44}$ which works in a corresponding recess in the arm of the crank $M^{46}$ which is pivoted at $M^{47}$ on the bracket $M^{13}$. A spring contained in the recess of the crank $M^{46}$ between the bottom thereof and the plunger $M^{44}$ absorbs the shock when the projection $M^{43}$ suddenly strikes the head of the plunger $M^{44}$ which is caused as explained hereinafter. The plunger $M^{44}$ tends to engage the projection $M^{43}$ through action of a spring (not shown) fastened to an arm of the crank $M^{46}$ and to the housing which encloses a large portion of the cutting off mechanism above the base 14 and which is not shown in the drawings. The amount of the projection $M^{43}$ engaged by the plunger $M^{44}$ may be regulated by adjusting the bolt $M^{50}$ (Figs. 8 and 9) which works in one arm of the crank $M^{46}$ and butts against the pin $M^{51}$ fastened in the bracket $M^{52}$ mounted on the base 14. The plunger $M^{44}$ is caused to release the projection $M^{43}$ by the action of a cam $M^{53}$ fastened to the cam shaft 22. The action of the cam $M^{53}$ is transmitted through a crank $M^{54}$ pivoted on the pin $M^{40}$ and having in one arm a roller $M^{55}$ riding on the cam $M^{53}$ and in the other arm an adjustable bolt $M^{56}$ which engages a rod $M^{57}$ slidably supported in the bracket $M^{52}$ and having a roller $M^{58}$ (Fig. 8) pinned in the upper end thereof which engages the beveled edge of an arm of the crank $M^{46}$ to turn the crank $M^{46}$ about its pivot $M^{47}$ and thus withdraw the plunger $M^{44}$ from engagement with the projection $M^{43}$ thereby permitting the rotation of the chuck through the friction clutch $K^{20}$ (Fig. 6) previously mentioned. The rod $M^{57}$ is normally held in a lowered position by the action of a spring $M^{59}$ encircling the rod $M^{57}$ and bearing against a stop $M^{60}$ fastened thereto and against the base 14. The rod $M^{57}$ is held in angular alignment by an arm $M^{61}$ attached thereto and having a slot $M^{62}$ in its end which receives the pin $M^{37}$. The amount of upward lift of the rod $M^{57}$ may be regulated by adjusting the bolt $M^{56}$ in the arm of the crank $M^{54}$. The contour of the cam $M^{53}$, (see also Fig. 9a) is such that once every revolution thereof the projection $M^{43}$ is released from the plunger $M^{44}$ to permit the rotation of the chuck and then for a somewhat shorter interval the plunger $M^{44}$ is permitted to engage the projection $M^{43}$ and so stop the rotation of the chuck to permit the discharge of the flare $K^{10}$ while the machine is indexed.

*The severing mechanism.*—The flare $K^{10}$ (Fig. 7) is severed from the tubing by a small cutter $P^{10}$ on the inside of the wall of the glass tubing 11 and a large cutter $P^{11}$ on the outside of the wall of the tubing 11. In general the action of the cutters is as follows. The small cutter $P^{10}$ is raised up inside the tubing 11 as the latter is being engaged by the chuck M and when the cutter $P^{10}$ is level with the large cutter $P^{11}$, the two cutters are gradually brought together to sever or cut off the flare $K^{10}$, both cutters preferably being rotated so that the peripheral speed of each cutter is substantially the same as the peripheral speed of the glass surface being cut. After the flare $K^{10}$ has been cut off, the two cutters are separated and the small cutter $P^{10}$ is lowered to permit the discharge of the flare $F^{10}$ and the indexing into position of the succeeding glass tubing 11. The small cutter $P^{10}$ is rotated only while in the raised position.

The small cutter $P^{10}$ is mounted in the upper end of the vertical shaft $P^{12}$ which is supported in the following manner. The bracket $K^{15}$, previously mentioned, supports a tubular member $P^{13}$ (Figs. 3 and 6) about which is pivoted the sleeve $P^{14}$ of the bracket $P^{15}$, the sleeve $P^{14}$ resting on the bracket $K^{15}$. A second bracket $K^{37}$, previously mentioned, is fastened below the sleeve $P^{16}$ of the bracket $P^{15}$. A tubular member $P^{17}$ (Fig. 7) carried by the sleeve $P^{16}$ provides a suitable bearing for the tubular elevating member $P^{18}$ which is rotatably held on the vertical shaft $P^{12}$ at the lower end by the set-screw collar $P^{19}$ and at the upper end by the taper pin collar $P^{20}$. The lower end of the vertical shaft $P^{12}$ is rotatably supported in the hub extension $K^{36}$ of the gear $K^{35}$, previously described, the gear $K^{35}$ being rotatably carried in the lower end of the bracket $K^{37}$ and being held thereon by the taper pin collar $P^{21}$ fastened to the upper end of the hub extension $K^{36}$. The vertical shaft $P^{12}$ is driven as follows. The gear $K^{35}$ has two pins $P^{22}$ fastened in its lower side and when the shaft $P^{12}$ is elevated as described hereinafter one of the pins $P^{22}$ engages and drives a pin $P^{23}$ fastened in a collar $P^{24}$ mounted on the lower end of the vertical shaft $P^{12}$ so that the shaft $P^{12}$ and cutter $P^{10}$ are rotated. The elevation of the cutter $P^{10}$ and the shaft $P^{12}$ is effected through the elevating member $P^{18}$ by the action of the cam $P^{25}$ (Fig. 6) mounted on the cam shaft 22. The action of the cam $P^{25}$ is transmitted through a lever $P^{26}$ which is pivoted at $P^{27}$ to the bracket $P^{28}$ fastened to the base 14 and which has a roller $P^{29}$ riding on the cam $P^{25}$. A slot $P^{30}$ in the end of the lever $P^{26}$ engages a square block $P^{31}$ which is rotatably mounted on the pin $P^{32}$ fastened in the lower end of the elevating member $P^{18}$. The member $P^{18}$ is free to move vertically but the angular alignment thereof is maintained by the guides $P^{33}$ and $P^{34}$ mounted on the bracket $K^{37}$ and engaging grooves on the lower end of the member $P^{18}$. A spring $P^{36}$ fastened to the lever $P^{26}$ and to a rod $P^{37}$ mounted on the base 14 tends to hold the elevating member $P^{18}$ in a lowered position. The contour of the cam $P^{25}$ is such that during the revolution thereof the small cutter $P^{10}$ is caused to be elevated for cutting the tubing which elevation causes the engagement of the driving means of the cutter as previously explained. After an interval during which the flare $K^{10}$ is severed from the tubing the small cutter $P^{10}$ is caused to be lowered to provide clearance.

The large cutter $P^{11}$ (Fig. 7) is held between the two plates $P^{38}$ and $P^{39}$ which are mounted on the vertical shaft $P^{40}$ between the taper pin collar $P^{41}$ fastened thereto and the nut $P^{42}$ which screws on the end of the shaft $P^{40}$. The shaft $P^{40}$ is rotatably carried in the sleeve $P^{43}$ mounted in the bracket $P^{44}$ which is pivoted about the tubular member $P^{45}$ (see Fig. 3) which is a part of the bracket $K^{15}$ previously mentioned. The shaft $P^{40}$ is driven by the gear $K^{45}$ previously described, which is fastened to the lower end thereof.

In order to provide clearance the two cutters $P^{10}$ and $P^{11}$ are normally separated but when prepared to cut are permitted to advance toward each other. This action of the cutters is effected in the following manner. On the edge of the bracket $P^{15}$, which carries the small cutter $P^{10}$, is a groove $P^{46}$ (Fig. 6) which receives the member $P^{47}$ (see also Figs. 3, 4 and 5). A bolt $P^{48}$ working in the slot $P^{49}$ (Fig. 5) in the member $P^{47}$ fastens the member $P^{47}$ to the bracket $P^{15}$. The head of the set screw $P^{50}$ which screws into the bracket $P^{15}$ bears against the end of the member $P^{47}$ and assists in positioning this member in the groove $P^{46}$. The inner end of the member $P^{47}$ has pinned therein a roller $P^{51}$ (Fig. 3) which rides upon the inclined surface $P^{52}$ of the wedging bar $P^{53}$. Riding on the opposite inclined surface $P^{54}$ of the wedging bar $P^{53}$ is a roller $P^{55}$ pinned in the member $P^{56}$ which is held in the groove $P^{57}$ in the end of the bracket $P^{44}$ by a bolt $P^{58}$ working in a slot $P^{59}$ in the member $P^{56}$ which is similar to the member $P^{47}$. The head of the set screw $P^{60}$ which screws into the bracket $P^{44}$ bears against the end of the member $P^{56}$ and assists in positioning the member $P^{56}$ in the groove $P^{57}$. A spring $P^{61}$ fastened to the pin $P^{62}$ mounted on the bracket $P^{44}$ and to the pin $P^{63}$ (Fig. 4) mounted on the bracket $P^{15}$ tends to draw the two brackets together swinging the bracket $P^{15}$ about the tubular member $P^{13}$ and the bracket $P^{44}$ about the tubular member $P^{45}$. This action of the spring $P^{61}$ is normally prevented by the wedging bar $P^{53}$ which separates the rollers $P^{51}$ and $P^{55}$ but which is withdrawn in the following manner to permit the advance of the cutters $P^{10}$ and $P^{11}$ when they are in position to cut the flare $K^{10}$ from the glass tubing. The wedging bar $P^{53}$ is slidably mounted in a guiding bracket $P^{64}$ (Fig. 4) which is mounted free to move horizontally in a bracket $P^{65}$ fastened to the base 14. A spring $P^{66}$ fastened to a pin $P^{67}$ on the wedging bar $P^{53}$ and to a pin $P^{68}$ on the guiding bracket $P^{64}$ tends to withdraw the wedging bar from between the rollers $P^{51}$ and $P^{55}$ but is normally prevented from so doing by the action of a cam $P^{69}$ mounted on the cam shaft 22. The action of the cam $P^{69}$ is transmitted through the crank $P^{70}$ which is pivoted at $P^{71}$ in the bracket $P^{65}$. The crank $P^{70}$ has pinned in one arm a roller $P^{72}$ riding on the cam $P^{69}$ and has fastened in the other arm an adjustable bolt $P^{73}$ which engages the lower end of the wedging bar $P^{53}$ to raise the bar when so acted upon by the cam $P^{69}$. The engagement of the bolt $P^{73}$ with the wedging bar $P^{53}$ may be regulated by adjusting the position of the bolt $P^{73}$ in the arm of the crank $P^{70}$. The contour of the cam $P^{69}$ is such that the wedging bar $P^{53}$ is normally held up to separate the brackets $P^{15}$ and $P^{44}$ until the cutters $P^{10}$ and $P^{11}$ are in position to act whereupon the wedging bar $P^{53}$ is permitted to be withdrawn by the action of the spring $P^{66}$. The amount of withdrawal of the wedging bar $P^{53}$ is determined by the position of the adjustable bolt $P^{74}$ which screws in the arm $P^{75}$ fastened to the upper end of the wedging bar and which strikes against the top of the guiding bracket $P^{64}$ to limit the downward movement of the bar $P^{53}$. The amount of withdrawal may be regulated by adjusting the bolt $P^{74}$ in the arm $P^{75}$.

The horizontal position of the cutters $P^{10}$ and $P^{11}$ relative to the glass tubing 11 may be regulated by adjusting the rod $P^{76}$ (Figs. 3, 4 and 5) which has a head $P^{77}$ projecting beyond the base 14 and which has a threaded portion working in a thread in the guiding bracket $P^{64}$ and whose end is rotatably held at $P^{78}$ in the bracket $P^{65}$. The action of the rod $P^{76}$ is such that the guiding bracket $P^{64}$ is moved horizontally along the slide $P^{79}$ on the bracket $P^{65}$, the brackets $P^{15}$ and $P^{44}$ being moved about their respective pivots by the presence of the wedging bar $P^{53}$ between their respective rollers.

By properly adjusting the horizontal position of the cutters $P^{10}$ and $P^{11}$ relative to the glass tubing 11, the upper end of the flare $K^{10}$ may be made substantially flush with the main portion of the tube, may be turned inwardly or outwardly as shown in Fig. 14. It is believed that an advantage exists in turning the upper end of the flare slightly outwardly as shown in C of Fig. 14, when leading-in wires are loaded through the flare on the usual stem making machine. This also prepares the glass tubing for the subsequent flaring operation.

The flare $K^{10}$, which is cut from the glass tubing 11 at the position H, when released by the engaging fingers $M^{18}$ and $M^{26}$ (Fig. 10) falls upon an incline $R^{10}$ (Figs. 1 and 2) which is fastened to the main member $M^{10}$ of the chuck and which slants toward the discharge chute $R^{11}$ (Fig. 1) to be delivered to a suitable container $R^{12}$ mounted on a side of base 14. An air jet $R^{13}$ which is suitably supported on the base 14 directs a stream of air upon the flare $K^{10}$ to blow the flare into the chute $R^{11}$. In order to deliver the flare $K^{10}$ into the container $R^{12}$, the chute $R^{11}$ is agitated by means of a ball link $R^{14}$ (Fig. 1) which has one end held in a socket $R^{15}$ on the chute $R^{11}$ and the other end held in an eccentric socket $R^{16}$ mounted on the upper end of the rod $R^{17}$ which is rotatably held in the bracket $R^{18}$ fastened to the base 14. The rod $R^{17}$ is driven from the main driving shaft 21 by means of a belt driven by a pulley on the shaft 21 and driving a pulley (not shown) on the lower end of the rod $R^{17}$. A spring $R^{19}$ fastened to the chute $R^{11}$ and to the bracket $R^{18}$ tends to draw the chute toward the base. As the rod $R^{17}$ is rotated the ball link $R^{14}$ working in the eccentric socket $R^{16}$ alternately raises and lowers the chute $R^{11}$ producing sufficient agitation to cause the flare $K^{10}$ to pass down the inclined surface of the chute $R^{11}$ into the container $R^{12}$.

While I have described a specific embodiment of my invention I do not wish to be limited thereto as modifications thereof will readily suggest themselves to those skilled in the art.

What I claim as new and desire to secure by Letters Patent of the United States, is:—

1. An apparatus for severing tubular glass comprising means for holding said tubular glass above the line of severing, means for rotating said upper holding means, means for holding the tubular glass below the line of severing, means for rotating said lower holding means synchronously with said upper holding means, cutting edges adapted to be brought into engagement with the inside and the outside of the wall of the tubular glass, and means for applying pressure to bring the cutting edges together.

2. An apparatus for severing tubular glass comprising means for holding said tubular glass above the line of severing, means for rotating said upper holding means, means adapted to be brought into engagement with the tubular glass to hold the same below the line of severing, means for rotating said lower holding means synchronously with said upper holding means, means for bringing said lower holding means into engagement with said tubular glass, cutting edges adapted to be brought into engagement with the inside and the outside of the wall of the tubular glass, and means for applying pressure to bring the cutting edges together.

3. An apparatus for severing tubular glass comprising means for holding said tubular glass above the line of severing, means for rotating said upper holding means, means adapted to be brought into engagement with the tubular glass to hold the same below the line of severing, means for rotating said lower holding means synchronously with said upper holding means, means for bringing said lower holding means into engagement with said tubular glass, rotatable cutting edges adapted to be brought into engagement with the inside and the outside of the wall of the tubular glass, means for bringing said cutting edges into engagement with the wall of the tubular glass, means for rotating each cutting edge and means for applying pressure to bring the cutting edges together.

4. An apparatus for severing tubular glass comprising an upper chuck for holding tubular glass, means for rotating said upper chuck, a lower chuck adapted to be brought into engagement with the tubular glass to hold the same below the line of severing, means for rotating said lower chuck, means for bringing said lower chuck into engagement with the tubular glass, a cutting edge adapted to be brought into engagement with the outside of the tubular glass wall, means for rotating said outside cutting edge, a cutting edge adapted to be brought into engagement with the inside of the tubular glass wall, means for rotating said inside cutting edge, means for bringing said outside and said inside cutting edges into engagement with the wall of the tubular glass and means for applying pressure to bring the cutting edges together.

5. An apparatus for severing tubular glass comprising an upper chuck for holding tubular glass, means for rotating said upper chuck, a lower chuck adapted to be brought into engagement with the tubular glass to hold the same below the line of severing, means for rotating said lower chuck, means for bringing said lower chuck into engagement with the tubular glass, a cutter for engaging the outside of the tubular glass wall, means for rotating said outside cutter, a cutter for engaging the inside of the tubular glass wall, means for positioning said inside cutter at the line of severing, means for rotating said inside cutter, means for bringing said cutters into engagement with the wall of the tubular glass and means for applying pressure to bring said cutters together.

6. An apparatus for severing tubular glass comprising an upper chuck for holding tubular glass, means for rotating said upper chuck, a lower chuck adapted to be brought into engagement with the tubular glass to hold the same below the line of severing, means for rotating said lower chuck, means for bringing said lower chuck into engagement with the tubular glass, a cutter for engaging the outside of the tubular glass wall, means for rotating said outside cutter, a cutter for engaging the inside of the tubular glass wall, means for positioning said inside cutter at the line of severing, means for rotating said inside cutter, means for bringing said cutters into engagement with the wall of the tubular glass, means for applying pressure to bring said cutters together, means for separating said cutters after the tubular glass has been severed, means for returning said inside cutter from the severing position, means for stopping the rotation of the lower chuck and means for releasing said lower chuck to discharge the severed tubular glass.

7. The method of severing a glass tube which consists in rotating said tube, fusing it at the severing point and then subjecting it, while rotating, to pressure between cutting edges placed inside and outside thereof.

8. The method of severing a glass tube which consists in rotating said tube, fusing it at the severing point and then subjecting it, while rotating, to pressure between rotating cutting edges placed inside and outside thereof.

9. The method of severing a glass tube which consists in rotating said tube, fusing it at the severing point and then subjecting it, while rotating, to pressure between a pair of rotating cutters placed inside and outside thereof, each cutter having a speed of rotation substantially equal to the speed of rotation of the surface against which it works.

10. An apparatus for severing a glass tube comprising means for rotating said tube, a pair of cutters mounted adjacent thereto, means whereby one of said cutters is caused to enter said tube, means for rotating said cutters and means for forcing them together.

11. An apparatus for severing a glass tube comprising means for rotating said tube, a pair of cutters mounted adjacent thereto, one having its cutting edge substantially in the plane of severance and the other having its cutting edge below said plane, means whereby one of said cutters is caused to enter the said tube, means for rotating said cutters, and means for forcing them together.

12. An apparatus for severing a glass tube comprising means for rotating said tube, means for fusing it at the severing point, a pair of cutters mounted adjacent thereto, one having its cutting edge substantially in the plane of severance and the other having its cutting edge below said plane, means whereby one of said cutters is caused to enter said tube, means for rotating said cutters and means for forcing them together to perform the severing operation.

13. An apparatus for severing glass tubes comprising a movable carrier for receiving a series of tubes, means for rotating said tubes, means for fusing each of said tubes in succession at the severing point, a pair of cutters mounted adjacent to the path of travel of said tubes, means whereby one of said cutters is caused to enter the tubes successively, means for rotating said cutters and means for forcing them together.

14. An apparatus for severing glass tubes comprising a carrier for receiving a series of tubes, means for rotating said carrier, means for rotating said tubes, means for fusing each of said tubes in succession at the severing point, a pair of cutters mounted adjacent to the path of travel of said tubes, means whereby one of said cutters is caused to enter the tubes successively, means for rotating said cutters and means for forcing them together.

15. An apparatus for severing glass tubes comprising a movable carrier for receiving a series of tubes, and maintaining them in a substantially vertical position, means for rotating said tubes, means for fusing each of said tubes in succession at the severing point, a pair of cutters mounted adjacent to the path of travel of said tubes, means whereby one of said cutters is caused to enter the tubes successively, means for rotating said cutters and means for forcing them together.

16. An apparatus for severing glass tubes comprising a carrier for receiving a series of tubes and maintaining them in a substantially vertical position, means for rotating said carrier, means for rotating said tubes, means for fusing each of said tubes in succession at the severing point, a pair of cutters mounted adjacent to the path of travel of said tubes, means whereby one of said cutters is caused to enter the tubes successively, means for rotating said cutters and means for forcing them together.

In witness whereof, I have hereunto set my hand this 1 day of July, 1921.

FRANCIS J. RIPPL.